United States Patent [19]

Johansson et al.

[11] Patent Number: 5,297,757
[45] Date of Patent: Mar. 29, 1994

[54] BUZZER MECHANISM IN A FISHING REEL

[75] Inventors: Arne Johansson, Mörrum; Bengt-Åke Henriksson, Svängsta, both of Sweden

[73] Assignee: Abu Garcia Produktion AB, Svangsta, Sweden

[21] Appl. No.: 910,594

[22] Filed: Jul. 8, 1992

[51] Int. Cl.[5] ............................................. A01K 89/033
[52] U.S. Cl. ...................................................... 242/306
[58] Field of Search ............... 242/302, 306, 307, 308, 242/296; 116/67 A, 67 R; 446/420, 422, 418

[56] References Cited

U.S. PATENT DOCUMENTS

| | | | |
|---|---|---|---|
| 2,675,193 | 4/1954 | Hull | 242/306 X |
| 3,050,271 | 8/1962 | Hull | 242/306 X |
| 4,153,220 | 5/1979 | Nakajima | 242/296 |
| 4,201,355 | 5/1980 | Ruin | 242/306 |
| 4,496,115 | 1/1985 | Kreft et al. | 242/306 |
| 4,523,726 | 6/1985 | Swisher | 242/306 X |

FOREIGN PATENT DOCUMENTS 2151495 7/1985 United Kingdom ................ 446/409

*Primary Examiner*—Daniel P. Stodola
*Assistant Examiner*—Michael R. Mansen
*Attorney, Agent, or Firm*—Browdy and Neimark

[57] ABSTRACT

A fishing reel has a frame and a line spool rotatably mounted therein. The frame has a side plate with a circumferential flange formed with a circumferentially directed slot. A buzzer meachnism is mounted in the fishing reel. The buzzer mechanism has a gear wheel non-rotatably connected to the line spool, a trigger mounted on the circumferential flange, and a U-shaped spring leaf, one leg of which is connected to the trigger. The trigger is displaceable along the slot in the circumferential flange between a first position, in which it maintains the other leg of the spring leaf in engagement with the gear wheel so as to produce a buzzing sound when the line spool rotates, and a second position, in which it maintains the other leg of the leaf spring out of engagement with the gear wheel.

3 Claims, 3 Drawing Sheets

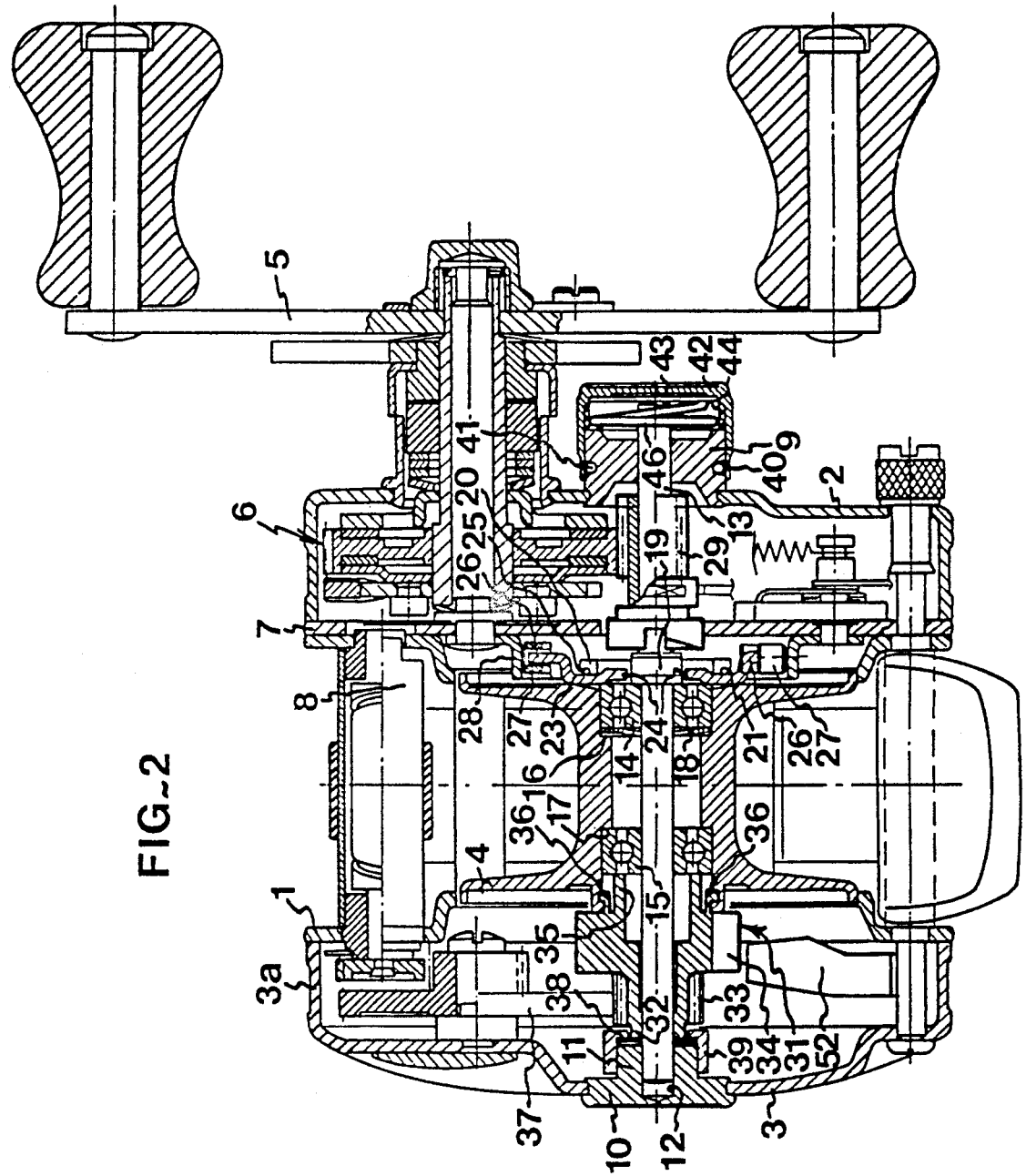
FIG_2

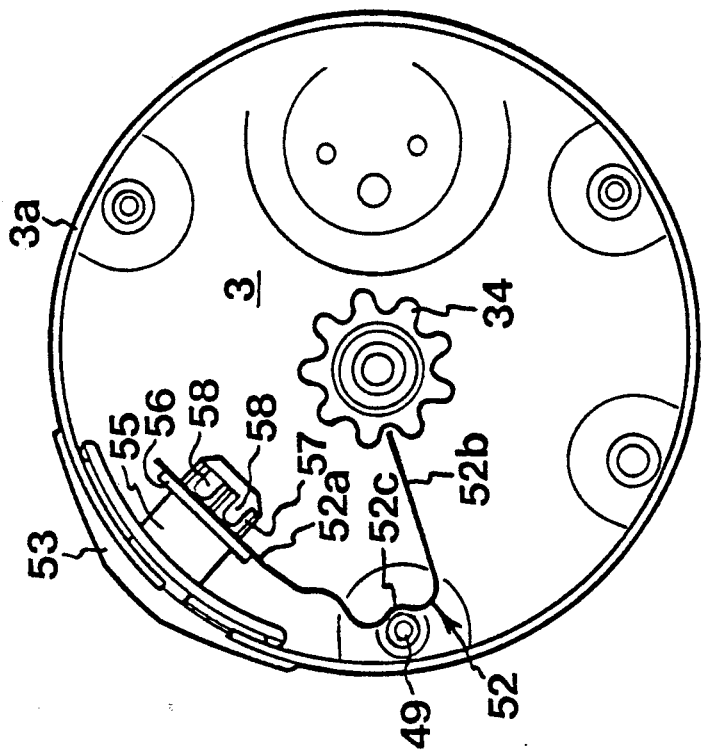
FIG._3
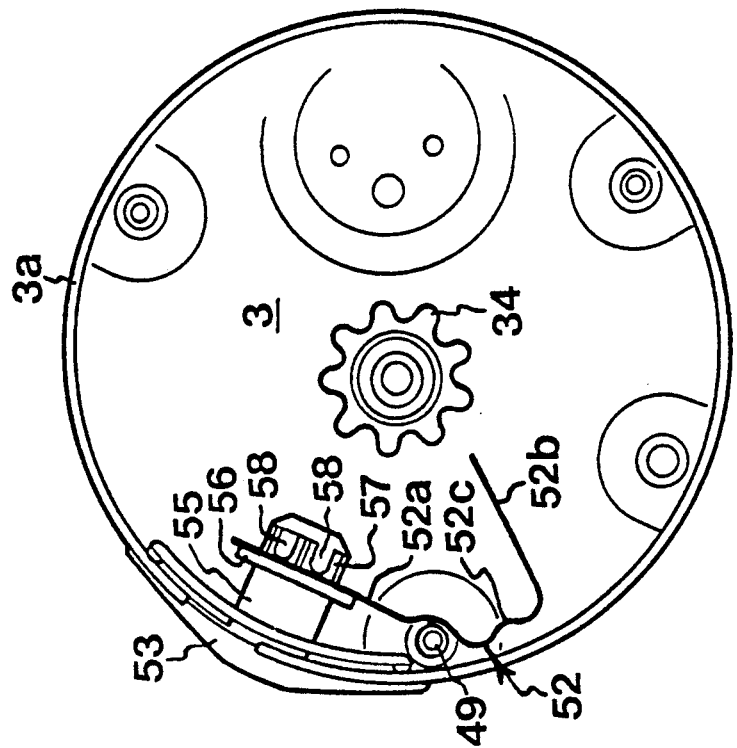
FIG._4

BUZZER MECHANISM IN A FISHING REEL

BACKGROUND OF THE INVENTION

The present invention relates to a buzzer mechanism in a fishing reel having a frame, a shaft extending through the frame, and a line spool rotatably mounted on the shaft, said frame having a side plate with an axially directed circumferential flange formed with a circumferentially directed slot.

A known buzzer mechanism for this type of fishing reel has a gear wheel non-rotatably connected to the line spool, resilient means mounted on the frame, and a trigger mounted on the circumferential flange of the side plate and having a substantially radial projection extending into the side plate through the slot in the circumferential flange, said trigger being displaceable along said slot between a first position, in which it maintains the resilient means in engagement with the gear wheel to produce a buzzing sound when the line spool rotates, and a second position, in which it maintains the resilient means out of engagement with the gear wheel.

In this known buzzer mechanism, the trigger is retained on the circumferential flange of the side plate by means of a spring leaf engaging the inner side of the circumferential flange and having a hole through which the projection of the trigger extends. The spring leaf is fixed on the projection of the trigger by means of a pin extending through the projection. The resilient means consists of a mounting plate, an actuator pin which extends through a slot in the mounting plate and is displaceable between two end positions in this slot, a buzzer pawl mounted on the actuator pin by means of a locking washer and adapted to cooperate with the gear wheel, and two springs mounted between the mounting plate and the buzzer pawl for maintaining the actuator pin in one end position. The projection of the trigger is designed for cooperation with the actuator pin in such a manner that, when the trigger is moved from its second position to its first position, the trigger projection urges the buzzer pawl, by the intermediary of the actuator pin and against the action of the springs, to a position in which the buzzer pawl engages the gear wheel for providing the buzzer function.

This known buzzer mechanism thus consists of a large number of components, making it difficult to mount.

SUMMARY OF THE INVENTION

The object of the present invention is to provide a buzzer mechanism consisting of but a few components and thus being considerably easier to mount than the prior-art buzzer mechanism described above.

This object is achieved by means of a buzzer mechanism in a fishing reel having a frame, a shaft extending through the frame, and a line spool rotatably mounted on the shaft, said frame having a side plate with an axially directed circumferential flange formed with a circumferentially directed slot, the buzzer mechanism comprising a gear wheel non-rotatably connected to the line spool, resilient means mounted on the frame, and a trigger mounted on the circumferential flange of the side plate and having a substantially radial projection extending into the side plate through the slot in the circumferential flange, said trigger being displaceable along said slot between a first position, in which it maintains the resilient means in engagement with the gear wheel for producing a buzzing sound when the line spool rotates, and a second position, in which it maintains the resilient means out of engagement with the gear wheel, said resilient means comprising a substantially U-shaped spring leaf, one leg of which is connected to the projection of the trigger and the other leg of which is so arranged as to engage the gear wheel when the trigger is in its first position, and to be disengaged from the gear wheel when the trigger is in its second position.

In a preferred embodiment, the projection of the trigger extends through a hole in said one leg of the spring leaf, the spring leaf being retained on said projection by snap means provided thereon.

In another preferred embodiment, the trigger has a substantially H-shaped portion, of which both pairs of legs resiliently embrace the circumferential flange of the side plate, and the slot in the circumferential flange of the side plate has an axially directed portion extending out to the free edge of the circumferential flange and having a slightly larger width than the web of the H-shaped portion.

BRIEF DESCRIPTION OF THE DRAWINGS

The invention will now be described in more detail with reference to the accompanying drawings, in which

FIG. 2 is an enlarged longitudinal section of the fishing reel shown in FIG. 1.

FIG. 3 shows the buzzer mechanism in a first position, and

FIG. 4 shows the buzzer mechanism in a second position.

DESCRIPTION OF THE PREFERRED EMBODIMENTS

Figure 1:
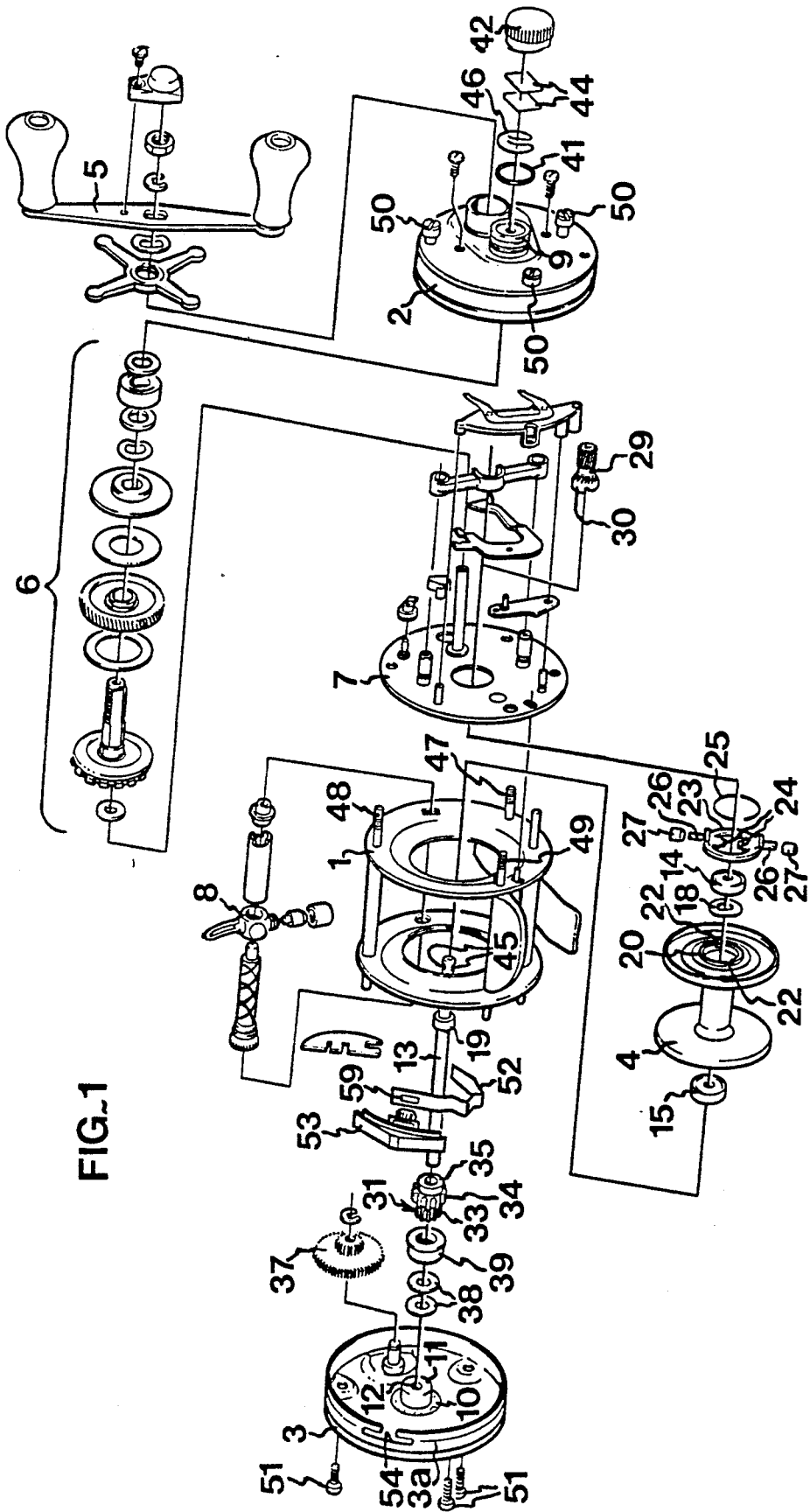
FIG. 1 is an exploded view showing a fishing reel provided with a buzzer mechanism according to the present invention.

The fishing reel illustrated in the drawings is of the multiplier type and has a frame 1 with detachable side plates 2 and 3, a spool 4 mounted in the frame 1 for receiving a fishing line (not shown), a handle 5 with an associated transmission mechanism 6 for rotating the line spool 4, a mounting plate 7 fixed on the frame 1 and supporting the handle 5 and the transmission mechanism 6, and a level-wind mechanism 8 mounted in the frame 1.

The handle 5 with the associated transmission mechanism 6, the mounting plate 7 and the other components supported thereby, as well as the level-wind mechanism 8 are of conventional type and therefore will not be described in more detail here.

The right side plate 2 has a central through opening in which a support bearing 9 is fixed. The support bearing 9 is in the form of an externally threaded sleeve projecting from the outside of the side plate 2. The left side plate 3 also has a central through opening in which a support bearing 10 is fixed. The support bearing 10 has an axial projection 11 which extends inwardly and has a blind bore 12, the diameter of which is equal to the inner diameter of the sleeve shaped support bearing 9. The two support bearings 9 and 10 support the line spool shaft 13 at both ends thereof. As appears from FIG. 2, the shaft 13 passes right through the support bearing 9. The diameter of the shaft 13 is slightly smaller than the inner diameter of the sleeve 9 and the diameter of the blind bore 12.

The line spool 4 is rotatably supported on the shaft 13 by means of two ball bearings 14 and 15. The outer ring of each ball bearing 14 and 15 abuts with its inner end surface on a shoulder 16 and 17, respectively, within the spool. The outer ring of the right ball bearing 14 abuts on the shoulder 16 by the intermediary of a spring washer 18. The outer end surface of the left ball bearing 15 is located a certain distance inwardly of the left end surface of the line spool 4, while the outer end surface of the right ball bearing 14 is located on a level with the right end surface of the line spool 4. A radially projecting annular shoulder 19 formed on the shaft 13 bears on the outer end surface of the inner ring of the right ball bearing 14.

The line spool 4 has a ring 20 which is coaxial with the line spool and integrally formed therewith and which projects axially from the right end surface of the spool. The ring 20 has an external circumferential groove 21 and two diametrically opposed recesses 22. A clutch ring 23 is provided on the ring 20 and has two radially inwardly projecting, diametrically opposed projections 24 engaging in the recesses 22 in the ring 20. The clutch ring 23 is retained in place on the ring 20 by means of a snap ring 25 disposed in the circumferential groove 21 thereof. The clutch ring 23 further has two radially outwardly projecting, diametrically opposed pins 26, each carrying a centrifugal weight 27 slidable on the respective pin 26. When the line spool 4 rotates at a high speed, the centrifugal weights 27 engage the inner circumferential surface of a brake ring 28 fixed on the left-hand side of the mounting plate 7. The centrifugal weights 27 and the brake ring 28 thus serve as a centrifugal brake for the line spool 4.

A gear wheel 29 connected to and driven by the handle 5 via the transmission mechanism 6 is mounted on the shaft 13 between the line spool 4 and the support bearing 9. The end of the gear wheel 29 facing the line spool 4 is cup-shaped with two diametrically opposed lugs 30. When the angler starts turning the handle 5 for retrieving the line, the gear wheel 29 is moved to the left from the position shown in FIG. 2 in a known manner not described in more detail here, whereby the shoulder 19 on the shaft 13 is received in the cup of the gear wheel 29 and the lugs 30 are brought into driving engagement with the projection 24 of the clutch ring 23. Upon continued rotation of the handle 5, the line spool 4 is rotated about the shaft 13.

A gear wheel unit 31 formed as a single piece is composed of a minor sleeve 32, a minor gear wheel 33, a major gear wheel 34 and a major sleeve 35. The sleeve 35 is inserted in the line spool 4 outside the left ball bearing 15 and is non-rotatably connected to the line spool 4 by means of splines (not shown). The sleeve 35 has two radially resilient projections 36 engaging in an inner circumferential groove in the line spool 4 and retaining the sleeve 35 axially therein. The minor gear wheel 33 meshes with a gear wheel 37 for driving the level-wind mechanism 8, and the major gear wheel 34 is part of the buzzer mechanism according to the present invention and is used for providing a buzzer function, as will be described in more detail hereinbelow.

A friction member 38, consisting of two friction washers of tin bronze, bears on the end surface of the axial projection 11 of the support bearing 10 and is retained thereon by a plastic cap 39 passed over the projection. The plastic cap 39 has a central opening, in which the minor sleeve 32 of the gear wheel unit 31 is accommodated. The end surface of the sleeve 32 then engages the friction member 38.

The right support bearing 9 has an outer circumferential groove 40, in which an O-ring 41 is mounted. An inwardly threaded bearing cap 42 is screwed on the support bearing 9. The bearing cap 42 has an internal central recessed portion 43 in its bottom. Two spring leaves 44 of tin bronze bridging the recessed portion 43 are placed in the bearing cap 42.

In its end located in the bearing cap 42, the shaft 13 has two circumferentially extending, diametrically opposed grooves 45, the bottoms of which are parallel to each other and form a flat on the shaft. A resilient member 46 which bears on the support bearing 9 and is urged against the inner circumferential surface of the bearing cap 42 so as to be non-rotatably retained therein engages in the grooves 45 in order, by engaging the flat, to retain the shaft 13 against rotation and, by pressing against the outer side wall of the grooves, to urge the shaft to the right, such that its right end bears on the bottom of the bearing cap 42 by the intermediary of the spring leaves 44.

As will have been appreciated, the braking effect of the friction member 38 is adjusted by means of the bearing cap 42. When the bearing cap 42 is screwed further on to the support bearing 9, it will shift the shaft 13 to the left against the action of the resilient member 46, the lug 19 on the shaft 13 urging the ball bearing 14 and hence the line spool 4 and the gear wheel unit 31 to the left, such that the sleeve 32 is pressed more firmly against the friction member 38, thus increasing the braking power thereof. Such an increase of the braking power may be required, for instance, when a heavy lure attached to the line should be cast.

When the bearing cap 42 is slightly unscrewed for reducing the braking effect of the friction member 38, the shaft 13 is shifted to the right by the action of the resilient member 46.

The frame 1 has three mounting rods 47, 48, 49 projecting from the right side of the frame in the form of externally threaded mounting pins, and from the left side of the frame in the form of internally threaded mounting sleeves. The side plate 2 and thus the mounting plate 7 are secured to the frame 1 by means of sleeve-shaped, internally threaded fixing screws 50 screwed on the mounting pins. The side plate 3 is secured to the frame 1 by means of fixing screws 51 screwed into the mounting sleeves.

The buzzer mechanism according to the present invention is mounted between the side plate 3 and the frame 1 and comprises, as mentioned above, the major gear wheel 34 of the gear wheel unit 31. The buzzer mechanism also comprises a substantially U-shaped spring leaf 52 adapted to provide a buzzer function in cooperation with the gear wheel 34.

A trigger 53 is mounted in a recess 54 formed in the axially directed circumferential flange 3a of the side plate 3 and open towards the frame 1. The recess 54 has a slot-shaped portion extending in the circumferential direction of the side plate 3, and an axially directed portion extending from the slot-shaped portion out to the free edge of the circumferential flange 3a (see FIG. 1). The trigger 53, preferably made as an integral piece of polymer material, has a substantially H-shaped portion (see FIGS. 3 and 4), of which both pairs of legs resiliently embrace the circumferential flange 3a. The trigger 53 has a substantially radially inwardly extending projection 55 which constitutes an extension of the web of the substantially H-shaped portion.

The projection 55 carries a transverse plate 56 and has a through recess 57 in its portion located radially inwardly of the plate 56. Two resilient flanges 58 axially protruding on each side of the projection 55 are provided in the recess 57.

The substantially U-shaped spring leaf 52 has a long leg 52a, a short leg 52b, and an intermediate web portion 52c having a slight inward bend or indentation. A corresponding inward bend or indentation is designed in the long leg 52a of the spring leaf adjacent the web portion 52c. A through hole 59, the shape of which corresponds to the cross-sectional shape of the trigger projection 55, is formed in the long leg 52a adjacent its free end. The spring leaf 52 is mounted on the trigger projection 55, which extends through the hole 59 in the long leg 52a abutting on the transverse plate 56 and retained on the projection 55 by the two resilient flanges 58 thereof. The short leg 52b of the spring leaf 52 is directed substantially radially inwards.

The trigger 53 is displaceable back and forth in the circumferential direction of the flange 3a between a front position (FIG. 3), in which the web of the substantially H-shaped portion engages the front boundary wall of the recess 54, and a rear position (FIG. 4), in which the web engages the rear boundary wall of the recess 54. When the trigger 53 is in its front position (FIG. 3), the mounting rod 49 engages in the inward bend of the web portion 52c of the spring leaf 52, so that the trigger is maintained in this position. When the trigger 53 is in its rear position (FIG. 4), the mounting rod 49 engages in the inward bend of the long leg 52a of the spring leaf 52, so that the trigger is maintained in this position.

When the trigger 53 is in its front position (FIG. 3), the short leg 52b of the spring leaf 52 extends into the teeth of the gear wheel 34. When the line spool 4 and, hence, the gear wheel 34 rotate, a buzzer function is thus obtained. When the trigger 53 is in its rear position (FIG. 4), the short leg 52b of the spring leaf 52 is located outside the teeth of the gear wheel 34 and the buzzer function is thus undone.

The buzzer mechanism described above consists of only three parts, namely the gear wheel 34, the trigger 53 and the spring leaf 52, and is exceptionally easy to mount. The gear wheel 34 is mounted in conventional manner. The leaf spring 52 is mounted on the projection 55 of the trigger 53 by inserting the projection 55 in the hole 59 in the long leg 52a of the spring leaf 52. The flanges 58 provided on the projection 55 are then pressed inwards by the boundary walls of the hole 59, to snap back to their initial position when the long leg 52a of the spring leaf 52 has entered into engagement against the transverse plate 56 on the projection 55. As mentioned above, the spring leaf 52 is retained on the projection 55 by the two flanges 58. The trigger 53, equipped with the leaf spring 52, is thereafter inserted in the recess 54 in the circumferential flange 3a of the side plate 3, with the web of the H-shaped portion located opposite the axially directed portion of the recess 54, which portion is wider, that is, has a larger circumferential extent, than the web of the H-shaped portion. The trigger 53 is retained on the side plate 3 in that both pairs of legs of the H-shaped portion resiliently embrace the circumferential flange 3a.

What we claim and desire to secure by Letters Patent is:

1. A buzzer mechanism in a fishing reel having a frame, a shaft extending through the frame, and a line spool rotatably mounted on the shaft, with the frame having a side plate with an axially directed circumferential flange having a free edge and a circumferentially directed slot, the buzzer mechanism comprising:

a gear wheel non-rotatably connected to the line spool;

a trigger mounted on the circumferential flange of the side plate and having a substantially radial projection extending into the side plate through the slot in the circumferential flange;

said trigger being displaceable along the slot between a first position and a second position;

a substantially U-shaped spring leaf having a first and a second leg and an intermediate web portion;

and a rod projecting from the frame being positioned in contact with said spring leaf;

said first leg being supportably carried on said projection of said trigger;

said web portion being in contact with said rod putting said second leg in engagement with said gear wheel to produce a buzzing sound when the line spool rotates when said trigger is in said first position;

said second leg being disengaged from said gear wheel when said trigger is in said second position.

2. The buzzer mechanism in accordance with claim 1 wherein said projection of said trigger extends through a hole in said first leg of said spring leaf;

resilient flanges on said projection retain said spring leaf on said projection.

3. The buzzer mechanism in accordance with claim 1 wherein said trigger has an H-shaped portion with a web and extending pairs of legs therefrom resiliently clamped to the circumferential flange of the side plate;

the slot in the circumferential flange of the side plate has an axially directed portion extending out to the free edge of the circumferential flange which has a slightly larger width than said web of said H-shaped portion.

* * * * *